US011886919B2

(12) United States Patent
Tootaghaj et al.

(10) Patent No.: US 11,886,919 B2
(45) Date of Patent: *Jan. 30, 2024

(54) DIRECTING QUERIES TO NODES OF A CLUSTER OF A CONTAINER ORCHESTRATION PLATFORM DISTRIBUTED ACROSS A HOST SYSTEM AND A HARDWARE ACCELERATOR OF THE HOST SYSTEM

(71) Applicant: Hewlett Packard Enterprise Development LP, Houston, TX (US)

(72) Inventors: Diman Zad Tootaghaj, Milpitas, CA (US); Anu Mercian, Milpitas, CA (US); Vivek Adarsh, Santa Barbara, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,895

(22) Filed: Jul. 26, 2022

(65) Prior Publication Data
US 2022/0382593 A1 Dec. 1, 2022

Related U.S. Application Data

(63) Continuation of application No. 17/222,160, filed on Apr. 5, 2021, now Pat. No. 11,436,054.

(51) Int. Cl.
*G06F 9/50* (2006.01)
*G06F 9/455* (2018.01)
*G06F 9/54* (2006.01)

(52) U.S. Cl.
CPC ........ *G06F 9/5027* (2013.01); *G06F 9/45558* (2013.01); *G06F 9/547* (2013.01); *G06F 2009/4557* (2013.01)

(58) Field of Classification Search
CPC .... G06F 9/5044; G06F 9/5055; G06F 9/4027; G06F 9/45558
See application file for complete search history.

(56) References Cited

U.S. PATENT DOCUMENTS 9,680,774 B2 6/2017 Pirko
9,692,642 B2 6/2017 Pirko
(Continued)

FOREIGN PATENT DOCUMENTS

CN 109690475 A 4/2019
CN 110704186 A 1/2020
(Continued)

OTHER PUBLICATIONS

Abdullah, M. et al., "Burst-Aware Predictive Autoscaling for Containerized Microservices," IEEE, May 2020, https://www.researchgate.net/profile/Waheed-Iqbal/publication/341530234_Burst-Aware_Predictive_Autoscaling_for_Containerized_Microservices/links/5ec693ae92851c11a87b826c/Burst-Aware-Predictive-Autoscaling-for-Containerized-Microservices.pdf.
(Continued)

*Primary Examiner* — Douglas B Blair
(74) *Attorney, Agent, or Firm* — Mauriel Kapouytian Woods LLP

(57) ABSTRACT

Example implementations relate to edge acceleration by offloading network dependent applications to a hardware accelerator. According to one embodiment, queries are received at a cluster of a container orchestration platform. The cluster includes a host system and a hardware accelerator, each serving as individual worker machines of the cluster. The cluster further includes multiple worker nodes and a master node executing on the host system or the hardware accelerator. A first worker node executes on the hardware accelerator and runs a first instance of an application. A distribution of the queries is determined among the
(Continued)

worker machines based on a queuing model that takes into consideration the respective compute capacities of the worker machines. Responsive to receipt of the queries by the host system or the hardware accelerator, the queries are directed to the master node or one of the worker nodes in accordance with the distribution.

20 Claims, 10 Drawing Sheets

(56) References Cited

U.S. PATENT DOCUMENTS

| | | | |
|---|---|---|---|
| 11,436,054 B1* | 9/2022 | Zad Tootaghaj | G06F 9/5027 |
| 11,544,113 B2* | 1/2023 | Wang | G06N 20/00 |
| 2015/0253837 A1 | 9/2015 | Sukonik et al. | |
| 2016/0004567 A1 | 1/2016 | Michel et al. | |
| 2018/0095750 A1 | 4/2018 | Drysdale et al. | |
| 2019/0138934 A1* | 5/2019 | Prakash | H04L 43/08 |
| 2019/0220703 A1* | 7/2019 | Prakash | G06F 9/505 |
| 2019/0222518 A1 | 7/2019 | Bernat et al. | |
| 2020/0026576 A1 | 1/2020 | Kaplan | |
| 2021/0117307 A1* | 4/2021 | MacNamara | G06F 11/302 |
| 2021/0149729 A1* | 5/2021 | Wang | G06F 9/5016 |
| 2021/0263779 A1* | 8/2021 | Haghighat | G06F 9/5061 |
| 2021/0392477 A1* | 12/2021 | Taft | H04L 67/56 |
| 2023/0136661 A1* | 5/2023 | Wang | G06N 3/04 |
| | | | 718/104 |
| 2023/0179967 A1* | 6/2023 | Taft | H04L 63/1408 |
| | | | 726/1 |

FOREIGN PATENT DOCUMENTS

| | | |
|---|---|---|
| WO | 2020/234792 A1 | 11/2020 |
| WO | 2021/101617 A1 | 5/2021 |

OTHER PUBLICATIONS

D. Coulter et al., "Performance Tuning Network Adapters," Dec. 23, 2019, pp. 1-13, Retrieved from the Internet on Nov. 3, 2020 at URL: <docs.microsoft.com/en-us/windows-server/networking/technologies/network-subsystem/net-sub-performance-tunino-nics>.

Daehyeok Kim et al., "Hyperloop: Group-Based NIC-Offloading to Accelerate Replicated Transactions in Multi-Tenant Storage Systems," SIGCOMM '18, ACM, Aug. 2018, pp. 297-312.

Daniel Firestone et al., "Azure Accelerated Networking: SmartNICs in the Public Cloud," NSDI '18, USENIX Association, Apr. 9, 2018, pp. 51-64 and title page.

J.G. Ziegler and N.B. Nichols, "Optimum Settings for Automatic Controllers," Transactions of the A.S.M.E., Nov. 1942, pp. 759-768.

Ming Liu et al., "E3: Energy-Effcient Microservices on SmartNIC-Accelerated Servers," 2019 USENIX, USENIX Association, Jul. 2019, pp. 363-378 and title page.

Ming Liu et al., "iPipe: A Framework for Building Distributed Applications on Multicore SoC SmartNICs," SIGCOMM'19, 2019, pp. 1-18.

Ming Liu et al., "Offloading Distributed Applications onto SmartNICs using iPipe," Aug. 2019, pp. 1-16, SIGCOMM '19.

P.M. Phothilimthana et al., "Floem: A Programming System for NIC-Accelerated Network Applications," OSDI '18, USENIX Association, Oct. 2018, pp. 663-679 and title page.

Sean Choi et al., "lambda-NIC: Interactive Serverless Compute on Programmable SmartNICs," eprint arXiv:1909.11958, Sep. 2019, pp. 1-15, Stanford University, USA.

Wikipedia, "PIO Controller," Mar. 25, 2021, pp. 1-26, Retrieved from the Internet on Mar. 26, 2021 at URL: <en.wikipedia.org/wiki/PID controller#Overview_of_tuning_ methods>.

* cited by examiner

DIRECTING QUERIES TO NODES OF A CLUSTER OF A CONTAINER ORCHESTRATION PLATFORM DISTRIBUTED ACROSS A HOST SYSTEM AND A HARDWARE ACCELERATOR OF THE HOST SYSTEM

BACKGROUND

Edge computing is transforming the way data is being handled, processed, and delivered from millions of devices around the world. The explosive growth of Internet-connected devices (e.g., Internet of Things (IoT) devices) as well as new applications requiring real-time computing power, continue to drive edge-computing systems. Despite the growth of computing needs at the edge, computing resources are still constrained as the compute performance of the current generation of hardware is plateauing while network performance continues to grow exponentially. This widening gap between network performance and compute performance might be addressed at least in part with the use of hardware accelerators, such as Smart Network Interface Cards (SmartNICs).

There has been a great deal of research on SmartNICs in recent years to explore application and network offloading; however, most of these efforts are limited to ad-hoc networks and application offloading to remove the burden of specific network processing tasks (e.g., cryptography, firewall processing, Transmission Control Protocol (TCP) offloading, and the like) from the host operating system.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
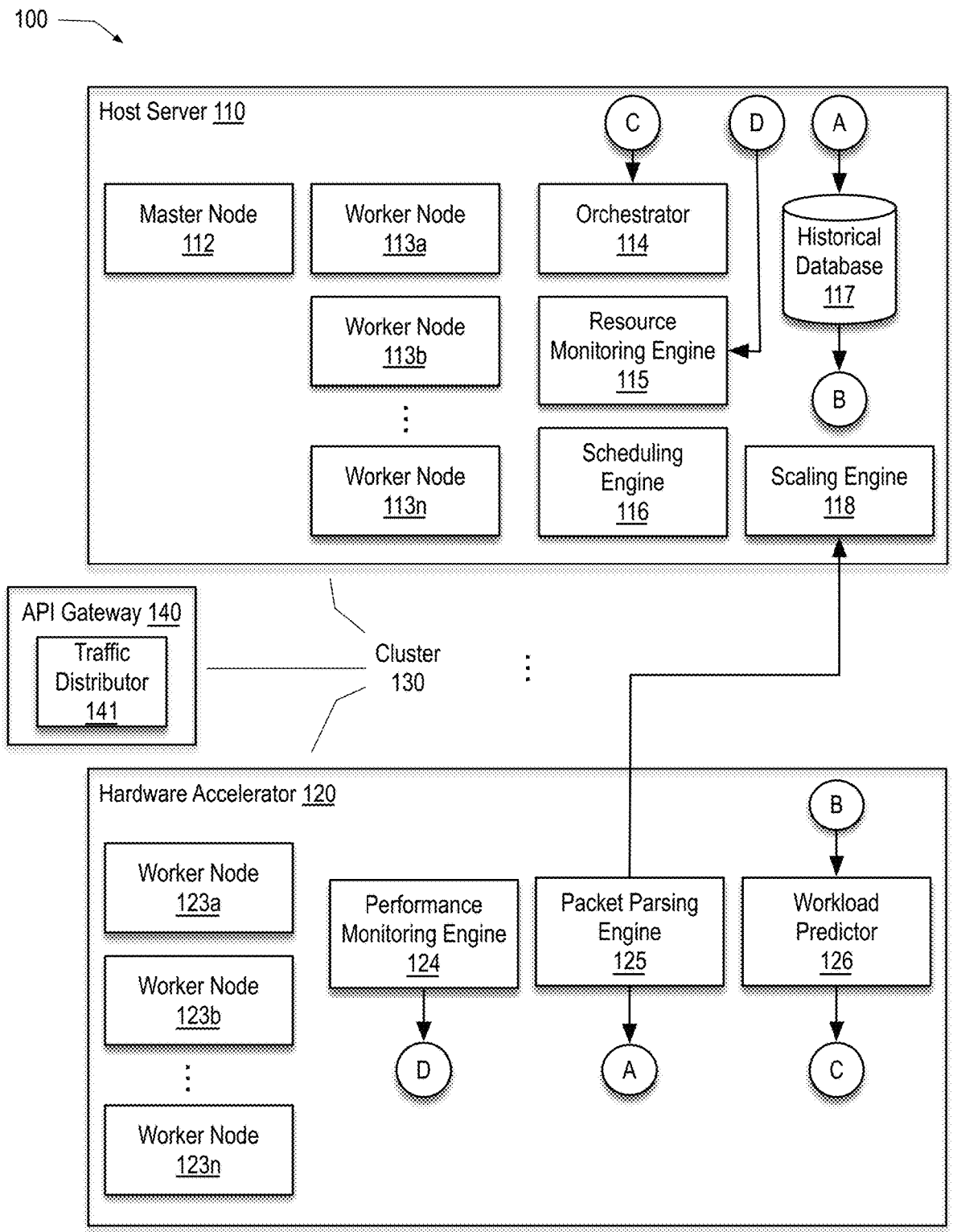
FIG. 1 is a block diagram conceptually depicting various functional units of an architecture in which a heterogeneous cluster of a container orchestration platform may be distributed across a host server and a hardware accelerator in accordance with an embodiment.

Embodiments described herein are generally directed to edge acceleration by offloading network dependent applications partially or entirely to a hardware accelerator. There has been a great deal of research on SmartNICs to explore application and network offloading; however, most of these efforts are limited to ad-hoc networks and application offloading to remove the burden of specific network processing tasks (e.g., cryptography, firewall processing, Transmission Control Protocol (TCP) offloading, and the like) from the host operating system.

While advancements in SmartNICs holds promise for high compute capacity in proximity to network packets, at a comparable lower cost than multiple servers at the edge, due to the various configurations and restricted nature of their platforms, it is very challenging to utilize and offload applications on SmartNICs. Meanwhile, most serverless platforms are not leveraging heterogeneity in hardware resources and the resource requirements of applications. This is due to the fact that current serverless platforms are designed based on the assumption that the hardware and requests are homogeneous. This assumption leads to sub-optimal performance of serverless platforms.

To clarify the problem, consider a simple example involving two serverless functions A and B that take 2 and 10 seconds, respectively, to run on a SmartNIC and 1 and 5 seconds, respectively, to run on a host operating system (OS). Assuming the overhead associated with the network stack of the host OS is 2 seconds, the response time of functions A and B are actually 3 seconds (for function A) and 7 seconds (for function B) if the functions are run on the host OS and 2 seconds (for function A) and 10 seconds (for function B) if the functions are run on the SmartNIC. As such, in this scenario, it would be better to offload function A to run on the SmartNIC to bypass the network stack overhead.

In various embodiments described herein, the fault tolerance and resource efficiency of serverless computing platforms is leveraged to achieve edge acceleration. Since the granularity of deployments is at the level of a function in serverless computing, the use of serverless computing may be more efficient than attempting to push a heavy virtual machine or containers onto a hardware accelerator. As described in further detail below, a platform is provided that enables edge acceleration by efficiently offloading network dependent applications partially or entirely onto a SmartNIC core based on the particular edge use-case at issue. Empirical data suggests the proposed architecture described herein has the potential for enhancing application performance by on the order of 75% with cost savings of on the order of 60%. Non-limiting examples of the types of applications that may be offloaded include analytics applications (e.g., an analytics application that is composed of a set of sub-tasks as a directed acyclic graph), a key-value store, microservices, network functions, and other serverless functions/workloads. Non-limiting examples of serverless computing platforms or frameworks that may be used in various embodiments include open-source solutions (e.g., OpenFaas, OpenWhisk, OpenLambda, Knative Serving, Fission) and commercial solutions (e.g., Amazon Lambda, Microsoft Azure Functions, and Google Cloud Functions).

In the context of various examples described herein, the platform includes a traffic distributor module, a workload prediction module, and a scaling engine that may implement one of three different autoscaling approaches (e.g., a queue-based auto-scaler, a custom pod scaler, or a control-theory based auto-scaler). The traffic distributor module may be used to split the traffic based on the computational power of each of the servers and the SmartNICs of the heterogeneous edge environment at issue. The workload prediction module may make use of the history of the workload in a window to predict future workloads. Based thereon, the queue-based auto-scaler may be used to scale up/down the number of replicas accordingly in the SmartNIC and the host OS. Alternatively, the custom-pod scaler or the control-theory based auto-scaler may be employed. For example, the customer-pod scaler may make use of custom metrics to scale up/down the number of pods. As described further below, the control-theory based auto-scaler may scale up/down the number of replicas based on a target value of a performance metric and a measured value of the performance metric. Various components of an example system architecture are described further below with reference to FIG. 1.

According to one embodiment, a query is received at a cluster of a container orchestration platform. The query may be an Hypertext Transfer Protocol (HTTP) request received from a client accessing the serverless workload functions. The cluster may be a heterogeneous cluster distributed across a first processing resource of a host system and a second processing resource of a hardware accelerator (e.g., a System on a Chip (SoC)-based SmartNIC) of the host system and may include a master node and multiple worker nodes. The master node may execute on the first processing resource or the second processing resource and a first worker node of the multiple worker nodes may execute on the second processing resource and run a first instance of an application. The query may then be directed to the master node or one of the multiple worker nodes.

While some embodiments of the present disclosure are described herein with reference to leveraging compute and storage capacity of one or more System-on-Chip (SOC)-based SmartNICs in a serverless framework, it is to be noted that various embodiments of the present disclosure are applicable to other types of hardware accelerators, including, but not limited to Field Programmable Gate Array (FPGA)-based SmartNICs, Application-Specific Integrated Circuit (ASIC)-based SmartNICs, co-processors, graphics processing units (GPUs), Tensor processing units (TPUs), other data processing units (DPUs), and the like.

In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "serverless framework" generally refers to a serverless computing platform or architecture that provides serverless computing. Non-limiting examples of existing serverless framework offerings include open-source solutions, such as, OpenFaas, OpenWhisk, OpenLambda, Knative Serving, Fission, and commercial solutions, such as, Amazon Web Services (AWS) Lambda, Microsoft Azure Functions, and Google Cloud Functions.

A "performance metric" generally refers to a metric relating to an application running within a serverless framework capable of measurement or observation. Non-limiting examples of performance metrics include a QoS) metric (e.g., packet loss, bit rate, error rates, throughput, transmission delay, delay variation, availability, jitter, latency, and the like), an SLA metric (e.g., query response time, request inter arrival times, service availability, defect rates, security performance, data rates, throughput, jitter, mean time between failures, mean time to repair, mean time to recovery, and the like) or other application performance metrics (e.g., average response time, error rates, count of application instances, request rate, application CPU/memory/bandwidth utilization, application availability, garbage collection, number of concurrent users, used/available resources, and the like). While embodiments described herein use query or transaction response time as an example target performance metric, those skilled in the art will appreciate the approach described herein is applicable to various other performance metrics. Similarly, while embodiments described herein consider an example feedback control loop in which the goal is to maintain 90% of the target response time measurements/observations lower than a specified threshold (referred to herein as the target value of the performance metric), other percentages may also be used.

A "feedback control system" or a "feedback control loop" generally refers to a system, including a controller, in which the performance of an application running within a serverless framework is measured or observed, and some parameter or characteristic (e.g., the number of replicas running a particular application) of the serverless framework is adjusted based at least in part on the measured or observed performance.

A "replica" generally refers to the unit of replication employed by the auto-scaling functionality of a serverless computing platform to provision or de-provision resources to accommodate workload being experienced or expected to be experienced by an application. Some serverless computing platforms run containers directly and therefore a container is the unit of replication for such serverless computing platforms. Other serverless computing platforms, such as Kubernetes, may wrap one or more containers into a higher-level structure called a "pod" and therefore a pod is the unit of replication for such serverless computing platforms.

FIG. 1 is a block diagram conceptually depicting various functional units of an architecture 100 in which a heterogeneous cluster (e.g., cluster 130) of a container orchestration platform may be distributed across a host server (e.g., host server 110) and a hardware accelerator (e.g., hardware accelerator 120) in accordance with an embodiment.

According to one embodiment, the container orchestration platform may be any available lightweight distribution of Kubernetes that is compatible with the host server, including, but not limited to K8s, K3s, KubeEdge, and the like.

In the context of various embodiments described herein novel techniques are described to predict, distribute and schedule workloads within a heterogeneous cloud platform (e.g., a heterogeneous edge environment) containing heterogeneous worker machines/nodes (e.g., servers and hardware accelerators (e.g., SmartNICs)) having various compute capacities. While in the context of the present example, for sake of simplicity, only a single host server and a single hardware accelerator are shown, it is to be understood, the heterogeneous edge environment may include any number of host servers each including one or more hardware accelerators.

In the context of the present example, the heterogeneous cluster (e.g., a Kubernetes cluster), including a master node (e.g., master node 112) and worker nodes (e.g., worker nodes 113a-n and worker nodes 123a-n), is distributed across the host server and the hardware accelerator. Depending upon the particular implementation, the master node (e.g., a Kubernetes Master) may be deployed on the hardware accelerator and more or fewer worker nodes may run on either the host server or the hardware accelerator. Similarly, more worker machines may be part of the cluster 130.

The cluster 130 also includes an Application Programming Interface (API) gateway 140 representing an entry point to the cluster 130. The API gateway 140 may implement an API (e.g., a Representational State Transfer (REST) API over Hypertext Transfer Protocol (HTTP)). Queries originated by clients (not shown) may first arrive at the API gateway 140 in the form of HTTP requests invoking methods of the API, for example, corresponding to various serverless functions implemented within the cluster 130.

A traffic distributor 141 may run on the API gateway 140 and distribute the traffic according to the computational power of each worker machine (server) in the heterogeneous edge environment. In contrast to traditional architectures in which a host server and its SmartNIC(s) together represent a worker machine (server) of a container orchestration platform cluster, in various embodiments described herein, the host server and its hardware accelerator(s) may each individually serve as a separate worker machine (server) or node of the cluster 130.

Assuming the queries arrive at the API gateway with an arrival rate of λ (queries per second) and assuming each host OS and hardware accelerator have a service rate of $\mu_i$ (queries per second), the queuing problem representing how to distribute the received client queries among n worker machines (servers) having respective arrival rates of $\lambda_1$, $\lambda_2$, ..., $\lambda_n$ (queries per second) can be solved for a queuing model involving one or more cases including a deterministic queuing model (e.g., D/D/1 queues) and a non-deterministic queuing model (e.g., M/M/1 queues) in which arrivals are determined by a Poisson process and job service times have an exponential distribution as described below. As the service rate may represent the performance of the corresponding host OS or hardware accelerator, in this manner, the queuing model employed may take into consideration respective compute capacities of the worker machines.

For D/D/1 queues, where the service time and arrival times are deterministic at each queue, the sojourn time may be minimized with the use of a proportional scheduler as follows:

$$\frac{\lambda_1}{\mu_1} = \frac{\lambda_2}{\mu_2} = \ldots = \frac{\lambda_n}{\mu_n} \qquad \text{Eq. \#1}$$

Next, assuming an M/M/1 queue at each server (worker machine), the traffic may be distributed as follows to make the sojourn time equal for each queue:

$$\lambda_1 - \mu_1 = \lambda_2 - \mu_2 = \ldots = \lambda_n - \mu_n \qquad \text{Eq. \#2}$$

In other words, the traffic can be distributed among N servers as follows:

$$\lambda_i = \mu_i + \frac{\lambda - \sum_{j=1}^{N} \mu_j}{N} \qquad \text{Eq. \#3}$$

where, i=1, ..., N

In embodiments in which the hardware accelerator represents a SmartNIC, traffic (e.g., representing queries or transactions received from clients (not shown) accessing the serverless workload functions via the API gateway 140) may ingress and egress a particular server via the hardware accelerator. The hardware accelerator may include a performance monitoring engine (e.g., performance monitoring engine 124), a packet parsing engine (e.g., packet parsing engine 125), and a workload predictor (e.g., workload predictor 126). The packet parsing engine may process the ingress packets and store information within a log database (e.g., historical database 117) for use by the workload predictor. The performance monitoring engine may monitor the service rates of the hardware accelerator and the host server, respectively, and may send the results to the workload predictor and an orchestrator (e.g., orchestrator 114) to facilitate decisions regarding the optimal number of replicas. A non-limiting example of workload prediction processing that may be performed by the workload predictor is described below with reference to FIG. 3A and FIG. 5.

In one embodiment, the host server includes the orchestrator, a scheduler (e.g., scheduling engine 116) operable to schedule workloads on the worker nodes, a local resource monitoring engine (e.g., resource monitoring engine 115) operable to provide input regarding local resource utilization to the scheduler, the log database, and the scaler. In the context of the present example, the scheduler and the scaler are collocated with the master node. The scaler may scale up/down the number of replicas (e.g., pods) using various approaches described herein.

Figure 2:
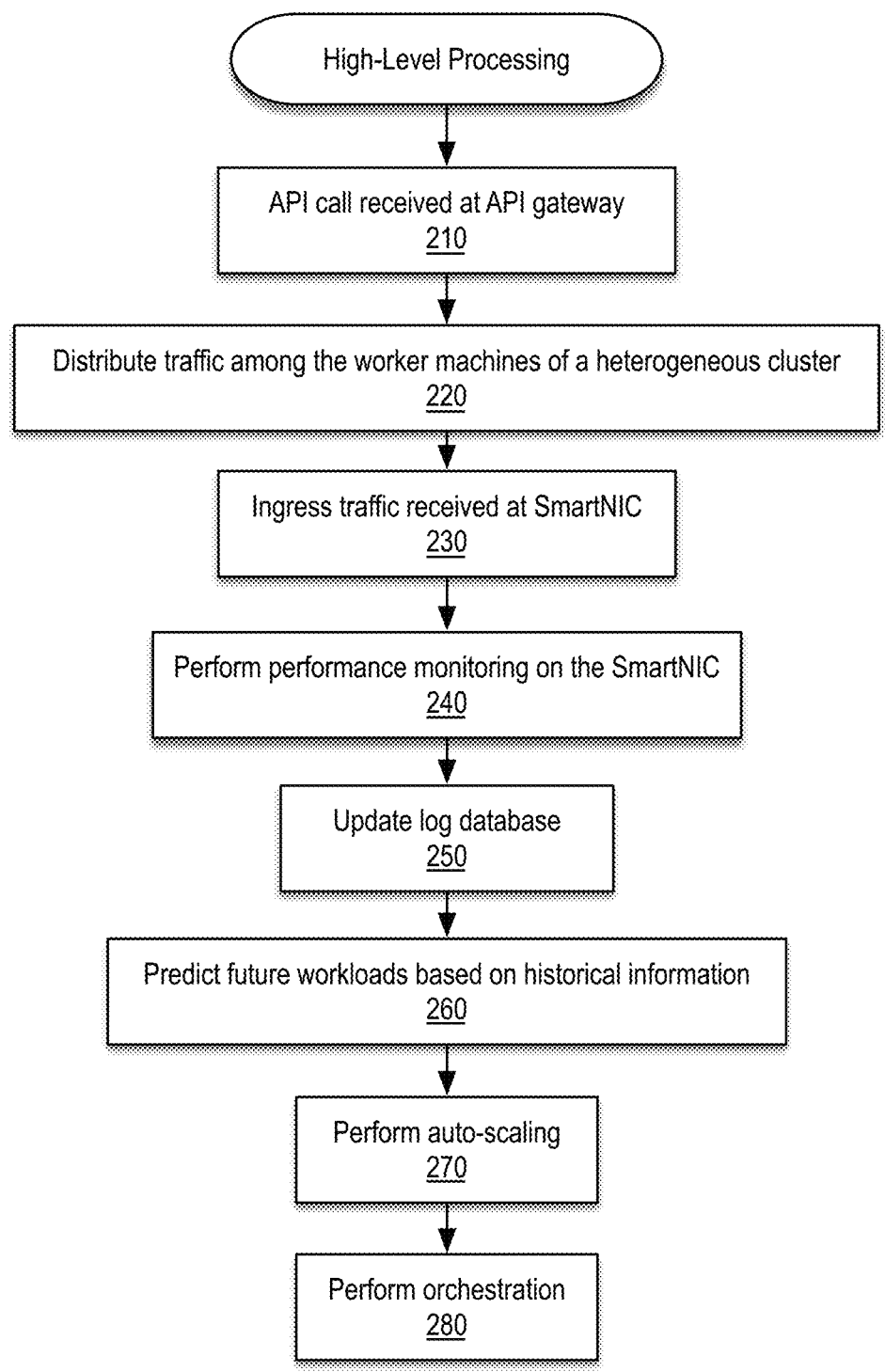
FIG. 2 is a flow diagram illustrating high-level processing in accordance with an embodiment.

FIG. 2 is a flow diagram illustrating high-level processing in accordance with an embodiment. At block 210, API calls are received at an API gateway (e.g., API gateway 140). At block 220, traffic distribution functionality implemented within the API gateway distributes the traffic among multiple worker machines of a heterogeneous cluster (e.g., cluster 130) of a serverless framework in which one or more hardware accelerators (e.g., hardware accelerator 120) of a host server (e.g., host server 110) may each individually represent or serve as a worker machine or node of the cluster. According to one embodiment, the traffic distribution is performed based on the respective computational power of the nodes of the cluster by implementing appropriate queuing models (e.g., represented by Eqs. #1-3 above) that take into consideration the potentially disparate service rates of the nodes.

At block 230, ingress traffic associated with queries are received at a SmartNIC (e.g., hardware accelerator 120) associated with a host server (e.g., host server 110).

At block 240, performance monitoring information may be updated responsive to receipt of the ingress traffic. In one embodiment, the performance monitoring performed on the SmartNIC includes tracking of service rates and arrival rates for use in connection with evaluating the queuing models (e.g., Eqs. #1-3 above) and/or performing workload predictions.

At block 250, a log database (e.g., historical database 117) may be updated with information to facilitate workload prediction, including, among other information, information regarding arrival time of queries, service rates, and arrival rates.

At block 260, future workloads may be predicted based on the historical information stored in the log database. According to one embodiment, in order to provision the right number of replicas proactively to meet a service level agreement (SLA), future workload demands may be predicted ahead of time. The prediction module (e.g., workload predictor 126) may use a variety of different training and/or prediction approaches to predict workload bursts so as to mitigate the impact of container cold start latency. Non-limiting examples of models that may be used include a support vector regression (SVR) prediction model and a deep learning model. In one embodiment, the prediction model is based on past observations of the workload over a window size of W time units. The window size may be dynamically adjusted based on workload variations observed over time. For example, the training window size may be increased responsive to the workload variation over the current window being less than a first threshold (e.g., 10%) and may be decreased when the workload variation is more than a second threshold (e.g., 20%). The workload prediction may be performed local to the host server or may be offloaded to the SmartNIC to reduce the load on the host OS and to facilitate the availability of early prediction results to enable prompt scale up/down decisions. Further description regarding an example of workload prediction processing that may be performed by the workload predictor is provided below with reference to FIG. 3A and FIG. 5.

At block 270, auto-scaling may be performed. According to one embodiment, a queue-based auto-scaler is employed that performs autoscaling based on the arrival rate of the predicted workload, the current number of replicas, and the current service rate of the replicas. In one embodiment, after splitting the traffic among multiple queues, the number of replicas at each queue may then be scaled up/down as appropriate based on a queue-based auto-scaling algorithm. In one embodiment, the queue-based auto-scaling algorithm is based on the arrival rate of the predicted workload at time t (i.e., $\lambda_t$), the current number of replicas ($r_t$), and the current service rate of the replicas at each server/SmartNIC ($\mu_t$). Based on the foregoing, the system utilization may be expressed as follows:

$$\rho_t = \frac{\lambda_t}{r_t \mu_t} \qquad \text{Eq. #4}$$

Then, the probability that the queue is idle may be calculated as follows:

$$P_0 = 1 / \left( \sum_{n=0}^{r_t-1} \frac{(r_t \rho_t)^n}{n!} + \frac{(r_t \rho_t)^{r_t}}{r_t!(1-\rho_t)} \right) \qquad \text{Eq. #5}$$

The queue length is:

$$L_q = \frac{r_t^{r_t} p_t^{r_t+1}}{r_t!(1-rho_t)^2} P_0 \qquad \text{Eq. #6}$$

And, the expected waiting time on the queue is:

$$T_q = L_q / \lambda_t \qquad \text{Eq. #7}$$

Then, given the current number of replicas and the systems service time ($T_s$), the system's latency can be calculated as:

$$T = T_q + T_s \qquad \text{Eq. #8}$$

If the system's latency (T)+2δ (where 2δ accounts for the auto-scaling startup latency) is larger than the target SLA latency, then the number of replicas may be scaled up. Alternatively, if the system's latency (T)+δ is smaller than the target SLA latency, then the number of replicas may be scaled down. In one embodiment, to reduce the time complexity of the auto-scaling, the optimal number of replicas may be determined using a binary search algorithm to search a table of latencies pre-calculated queue latency values for various numbers of replicas by comparing the target SLA latency with the pre-calculated values. For purposes of completeness and without limitation, a pseudo code example of an example auto-scaling algorithm ("Algorithm 1") that may be implemented by the auto-scaling module is presented below:

| Algorithm #1-Example Auto-Scaling Algorithm |
| --- |
| 1. Inputs: Arrival rate of jobs $\lambda_t$, service rate of each server and/or SmartNIC $\mu_t$, and the container's startup latency δ. |
| 2. Output: New number of Replicas $R_k$ |
| 3. Pre-calculate the latency for the range of replicas: |
| 4.    for $r_t = 1$ to MaxReplicas do |
| 5.       $\rho_t = \dfrac{\lambda_t}{R_t \mu_t}$ |
| 6.       $P_0 = 1 / \left( \sum_{n=0}^{r_t-1} \dfrac{(r_t \rho_t)^n}{n!} + \dfrac{(r_t \rho_t)^{r_t}}{r_t!(1-\rho_t)} \right)$ |
| 7.       $L_q = \dfrac{r_t^{r_t} p_{r_t+1}}{r_t!(1-\text{rho}_t)^2} P_0$ |
| 8.       $T_q = L_q / \lambda_t$ |
| 9.       $T = T_q + T_s$ |
| 10.    end |
| 11.    if T + 2δ > TargetSLA then |
| 12.       Scale up to the minimum replicas from the pre-calculated table where T + 2δ ≤ TargetSLA; |
| 13.    end |
| 14.    if T + δ < TargetSLA then |
| 15.       Scale down to the minimum replicas from the pre-calculated table where T + δ ≥ TargetSLA; |
| 16.    End |

To reduce the time complexity of Algorithm 1, one can pre-calculate the for loop in Algorithm 1 and use a lookup table to increase the auto-scaling time.

Various alternative autoscaling approaches to the queue-based auto-scaler that work to meet the target latency may be employed, including a custom pod auto-scaler that uses custom metrics and scales up/down the number of pods according to pre-defined thresholds or a control-theory based auto-scaler as described below with reference to FIG. 3B.

At block 280, orchestration is performed to direct queries to the master node or to worker nodes in accordance with the traffic distribution determined at the API server and to achieve the number of replicas/pods output by the auto-scaling approach implemented (e.g., queue-based auto-scaling, custom pod scaling, or control-theory based auto-scaling).

Figure 3A:
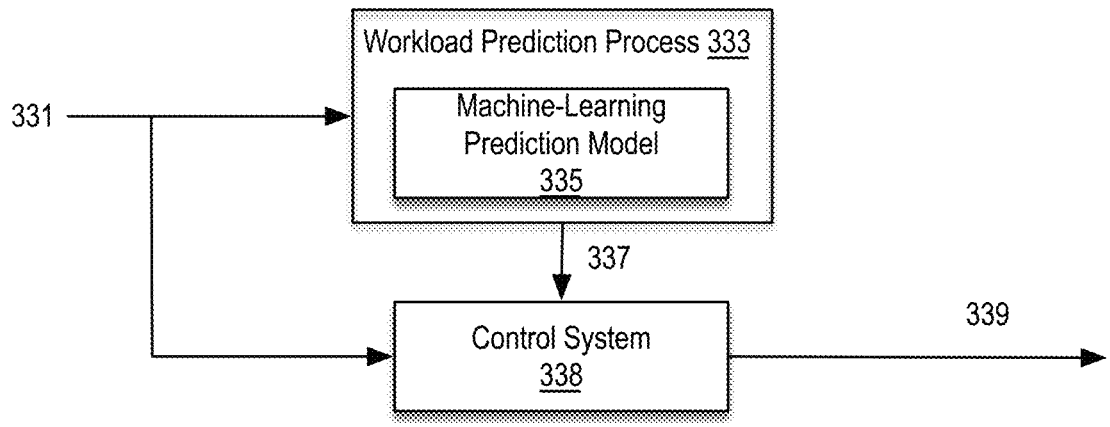
FIG. 3A is a block diagram illustrating interactions between a workload prediction process and a control system in accordance with an embodiment.

FIG. 3A is a block diagram illustrating interactions between a workload prediction process 333 and a control system 338 in accordance with an embodiment. Workload prediction process 333 is a non-limiting example of workload predictor 126 of FIG. 1. Depending upon the particular implementation, the workload prediction may be performed on the host server (e.g., host server 110) or one of the hardware accelerators (e.g., hardware accelerator 120). In general, the workload prediction process 333 performs an estimation of future workload and the control system 338 produces an output 339 to cause the number of replicas for the application at issue to be dynamically auto-scaled.

In one embodiment, the control system 338 may be a feedback control system that determines an optimal amount of resources so as to allow an application to handle the estimated future workload. Based on the amount of resources expected to be consumed by the future workload and the computing capabilities of the replicas, a number of replicas can be determined by the control system 338 based thereon.

In one embodiment, a proactive control-theory based approach may be employed in which a prediction model (e.g., machine learning prediction model 335) facilitates handling of the fluctuating resource usage pattern. Inputs 331 to the workload prediction process 333 may include one or more of a target performance metric, a previous number of replicas in use at prior times and past values of the target performance metric at the prior times. An output 337 of the workload prediction process 333 may be in the form of a number of future requests estimated to be received at or by a future time. The output 337 can then be used as an input to the control system 338 to determine an output 339 of the control system 338. According to one embodiment, the output 339 is a suggested number of replicas to be provisioned for the application being run on the worker nodes (e.g., worker nodes 113a-n and worker nodes 123a-n) of a cluster (e.g., cluster 130) to accommodate the workload represented by the estimated future requests.

According to one embodiment, the control system 338 includes a controller and is part of a feedback control loop. Non-limiting examples of the controller include a proportional-integral-derivative (PID) controller and a proportional integral (PI) controller. A PI controller is a special case of a PID controller in which the derivative (D) of the error is not used. Further details regarding a feedback control loop that may be used in accordance with an embodiment is provided below with reference to FIG. 3B.

Turning now to the machine-learning prediction model 335, in one embodiment, in order to proactively provision a sufficient number of replicas to maintain compliance with an SLA, for example, as noted above, the future workload demands of an application are predicted ahead of time. Those skilled in the art will appreciate that a number of machine-learning techniques including, but not limited to, support vector regression (SVR) models and deep learning models (e.g., deep neural networks (DNNs)) can be trained to make predictions based on historical observations. Depending upon the particular implementation, a variety of classical machine-learning techniques might be appropriate for use as the machine-learning prediction model 335.

In a serverless framework, since any delay in the prediction phase can impact the performance as it adds more delay to container startup latency, prediction time may be a factor to be considered in selecting an appropriate machine-learning prediction model. As empirical data suggests SVR models to be the most accurate of machine learning algorithms for the purpose of predicting cloud workloads (due in part to training and prediction overhead of DNNs), various examples provided herein are described with reference to the use of SVR models. According to one embodiment, a radial basis function (RBF) SVR kernel is used to train the machine-learning prediction model 335 to predict workload bursts. In alternative embodiments various other SVR kernels may be used including, but not limited to, linear, polynomial, and sigmoid SVR kernels.

Figure 3B:
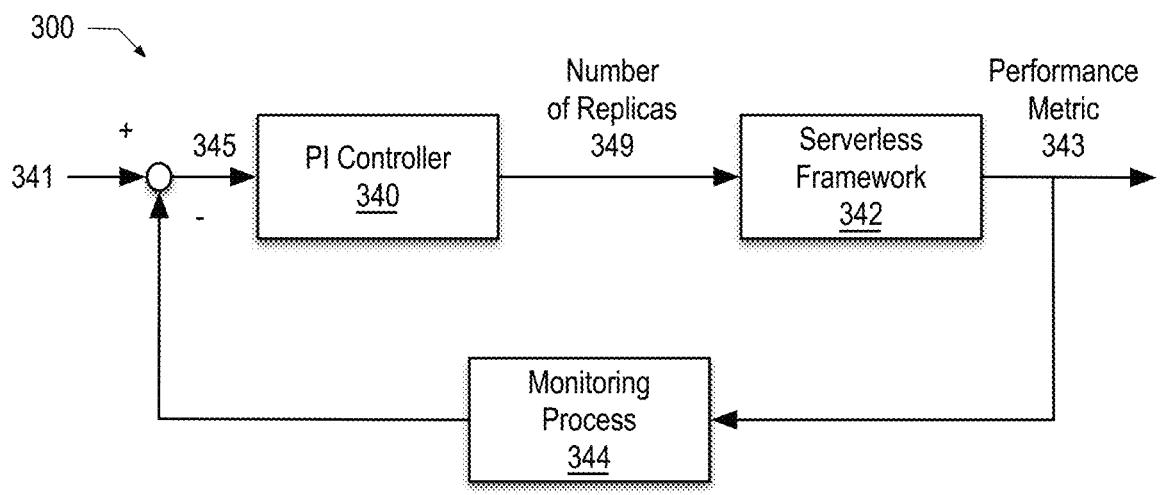
FIG. 3B is a block diagram illustrating a feedback control loop in accordance with an embodiment.

FIG. 3B is a block diagram illustrating a feedback control loop 300 in accordance with an embodiment. Feedback control loop 300 represents a non-limiting example of processing that may be performed by scaling engine 118 in an embodiment supporting a control-theory based auto-scaler.

Linear feedback control systems generally involve a controller that applies a correction to a controlled variable based on the difference between the desired value (referred to as the setpoint) and a measured value (referred to as the process variable). In the context of the present example, the feedback control loop 300 includes a PI controller 340, a serverless framework 342 (which may be running within the container orchestration platform) and a monitoring process 344.

According to one embodiment, the PI controller 340 dynamically changes a number of replicas 349 for the application based on a target value of a performance metric 341 and a measured value of the performance metric 343. For example, the PI controller 340 may receive as an input the difference or error 345 between the target performance metric 341 and the performance metric 343 measured by the monitoring process 344. According to one embodiment, the monitoring process 344 continuously monitors the performance metric 343 during each prediction window of time. While embodiments described herein consider an example monitoring process in which the performance metric of interest is sampled one time during a window of time W, other monitoring rates may also be used. Additionally, the predefined window of time may be dynamically increased or decreased in size depending upon various factors (e.g., the workload variation over the current observation window) as described below.

For purposes of illustration, various examples described herein will use an invocation rate (e.g., queries per second) as an example of a measure of workload and a given percentile response time (e.g., 90 percentile response time) as the target performance metric 343. Notably, as indicated above, the methodology described herein is not limited to any particular performance metric, but rather is generally applicable to any desired SLA or QoS metric. Furthermore, the target performance metric may represent a logical condition or a function of a combination of multiple SLA or QoS metrics. Similarly, while for sake of illustration an example of the proposed approach involves keeping 90 of 100 (90%) of the query response times lower than a threshold (e.g., specified by an SLA), other ratios/percentages and/or thresholds may be employed and may be initially configured and/or adjusted based on a variety of external or internal sources (e.g., user input, a configuration file, an SLA, etc.).

According to one embodiment, the serverless framework 342 is treated as the dynamic system to be controlled by the output of the PI controller 340. For purposes of illustration, an example will now be described with the performance metric 343 output by the dynamic system being a response time (Res(k)) and a number of replicas (R(k)) being the input to the dynamic system. In this example, the goal is to dynamically scale the number of replicas so as to maintain a threshold (e.g., 90%) of the observed response times at or above a target value (reference value ($Res_{ref}$)). Stated another way, the reference value ($Res_{ref}$) indicates the value below which a given percentage of target value observations fails. Continuing with the present example, PI controller 340 can be represented as follows:

$$R(k)=R(k-1)+(K_p+K_I)E(k)-K_pE(k-1) \quad \text{Eq. \#9}$$

where, $$E(k)=Res_{ref}-Res(k) \quad \text{Eq. \#10}$$

and where, k represents the time for which the new number of replicas is being calculated.

R(x) represents the number of replicas at time x.

E(x) represents the error in response time at time x.

$Res_{ref}$ is a response time value below which a given percentage (e.g., 10%) of target value observations fail.

Res(k) is the response time at time k.

$K_p$ represents the proportional gain, one of the tuning parameters of the controller.

$K_I$ represents the integral gain, another tuning parameter of the controller.

According to various embodiments, the parameters of the PI controller 340 are tuned so as to provide stability and avoid thrashing in relation to the new number of replicas output by the PI controller 340. In one embodiment, the tuning approach described in J. G. Ziegler and N. B. Nichols. Optimum settings for automatic controllers. trans. ASME, 1942, which is incorporated herein by reference in its entirety for all purposes (the "Ziegler-Nichols method"), is used to find the tuning parameters of the PI controller 340, by first setting $K_I$ in Eq. #9 to zero and then incrementally increasing the proportional gain (Kp) of Eq. #9 until it reaches the ultimate gain $K_u$ at which the response time starts to oscillate (see, e.g., FIG. 7). Let $K_u$ be the gain and $T_u$ be the oscillation period. Then, $K_p$ of Eq. #9 is set to a fraction of $K_u$ (e.g., $0.45K_u$) and $K_I$ is set to a fraction of a function of $K_u$ and $T_u$ (e.g., $0.54K_u/T_u$) The new number of replicas (R(k)) resulting from this calculation is then rounded to the closest integer to avoid fractional values. As those skilled in the art will appreciate, other tuning approaches may be used. For example, as an alternative to the Ziegler-Nichols tuning method, tuning values may be determined by the TLC tuning rules created by Tyreus and Luyblen.

While for purposes of providing a concrete example, Eq. #9 and Eq. #10 (above) are expressed with reference to a particular target performance metric (i.e., response time), those skilled in the art will appreciate these equations can be used for any desired target performance metric by simply substituting the desired target performance metric for the response time (Res(k)) in Eq. #10 and substituting a reference value for the desired target performance metric for the response time reference value ($Res_{ref}$) in Eq. #10.

While various parameter tuning and performance metric monitoring examples provided herein are described with reference to a PI controller, because a PI controller is a special case of a PID controller, those skilled in the art will appreciate the examples are equally applicable to PID controllers.

In various examples described herein, each worker node (e.g., worker nodes 113a-n and worker nodes 123a-n) may include or be associated with at least one processing resource (e.g., one or more central processing unit core(s), a Graphics Processing Unit, a microcontroller, a microprocessor, an application-specific integrated circuit (ASIC), a field programmable gate array (FPGA), etc.), a memory resource (e.g., random access memory (RAM), read-only memory (ROM), electrically erasable programmable read-only memory (EEPROM), etc.,), and a storage resource (e.g., a storage device such as a hard disk drive, a solid state drive, flash memory, etc.). The various functional units (e.g., orchestrator 114, resource monitoring engine 115, scheduling engine 116, scaling engine 118, performance monitoring engine 124, packet parsing engine 125, workload predictor 126, workload prediction process 333, control system 338, PI controller 340, and monitoring process 344) described herein and the processing described below with reference to the flow diagrams of FIGS. 4-6 and 8-9 may be implemented in the form of executable instructions stored on a machine readable medium and executed by a processing resource and/or by other types of electronic circuitry. For example, some or all of the aspects of the processing may be performed by one or more virtual or physical computer systems of various forms, such as the host server 110, the hardware accelerator 120, or the computer system described with reference to FIG. 10 below.

Figure 4:
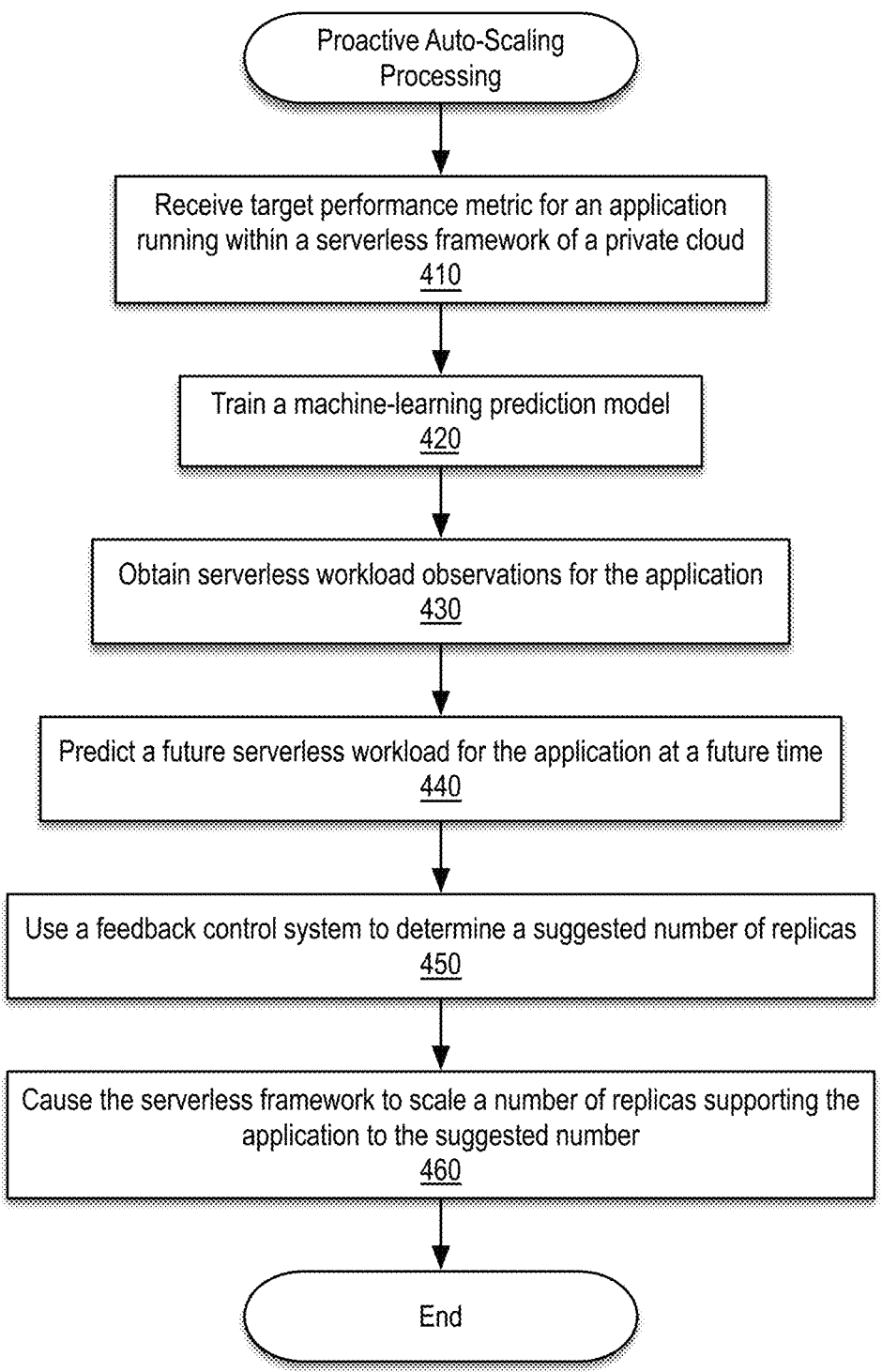
FIG. 4 is a flow diagram illustrating proactive auto-scaling processing in accordance with an embodiment.

FIG. 4 is a flow diagram illustrating proactive auto-scaling processing in accordance with an embodiment. In various examples described herein, a server (e.g., a host server 110 and/or one or more hardware accelerators 120, individually or in combination) may implement one of three different autoscaling approaches (e.g., a queue-based auto-scaler, a custom pod scaler, or a control-theory based auto-scaler). In the context of the present example, a non-limiting example of a proactive auto-scaling approach that makes use of a control-theory based auto-scaler is described.

At block 410, a target performance metric (e.g., latency) for an application running within the serverless framework is received.

At block 410, a target performance metric is received for an application running within the serverless framework of a private cloud. According to one embodiment, the target performance metric represents a QoS metric or a particular performance metric (e.g., latency) specified by an SLA. Alternatively, the target performance metric may represent a logical condition or a function of a combination of multiple SLA and/or QoS metrics. For example, the goal of the proactive auto-scaling processing may be to keep some predetermined or configurable threshold number of every 100 measurements of the performance metric at issue to be higher or lower, as the case may be, than another predetermined or configurable threshold (e.g., a threshold specified by an SLA).

At block 420, a machine-learning prediction model is trained. According to one embodiment, an RBF SVR kernel is used to train the machine-learning prediction model based on time series workload information (e.g., historically observed workload information or past workload information for a window of time up to and including the current time). Further details regarding an example training process is provided below with reference to FIG. 6.

At block 430, serverless workload observations for the application are obtained. According to one embodiment, the observations are measurements obtained by calling an application programming interface (API) exposed by the serverless framework. As described above with reference to FIG. 3B, in one embodiment, a monitoring process continuously monitors a value of a performance metric at issue as part of a feedback control loop and maintains the measured/observed values over a predefined window of time. As described further below, in one embodiment, the predefined window of time may be dynamically increased or decreased in size depending upon various factors (e.g., the workload variation over the current observation window).

At block 440, a future serverless workload is predicted for an application at issue for a future time. According to one embodiment, the prediction is performed by providing the trained machine-learning prediction model with the feature vector in a form of the monitored workload information obtained over the predefined window of time. In one embodiment, the workload prediction represents a prediction, as of the current time within a monitoring window, of the number of queries per second (QPS) expected to be received by the application at a future time. As an alternative to the number of queries per second, other workload characteristics can be predicted (e.g., CPU/memory/network bandwidth utilization) over time. An example of workload prediction processing is described further below with reference to FIG. 5.

At block 450, a feedback control system is used to determine a suggested number of replicas. According to one embodiment, the feedback control system receives as an input information regarding an expected future workload for an application during a future timeframe and outputs a number of replicas for the application for the future time as a function of the future workload prediction, a target value of a particular performance metric and a current value of the particular performance metric. For example, the feedback control system determines an optimal amount of resources that will enable the application to handle, at the future time, a number of transactions, queries or requests that has been predicted by the machine-learning prediction model will be received at the future time while satisfying an application performance target. Then, based on the determined amount of resources and other factors (e.g., the computing capabilities of the replicas), a number of replicas can be calculated. According to one embodiment, Eq. #9 and Eq. #10 can be used for a desired target performance metric by replacing the response time (Res(k)) in Eq. #10 with the desired target performance metric and replacing the response time reference value ($Res_{ref}$) in Eq. #10 with a reference value for the desired target performance metric.

At block 460, the serverless framework is caused to scale a number of replicas supporting the application to the suggested number of replicas determined in block 450. According to one embodiment, the feedback control system may be incorporated within or otherwise (e.g., by way of being granted appropriate permissions/access) directly control the auto-scaling functionality implemented by the serverless framework.

Figure 5:
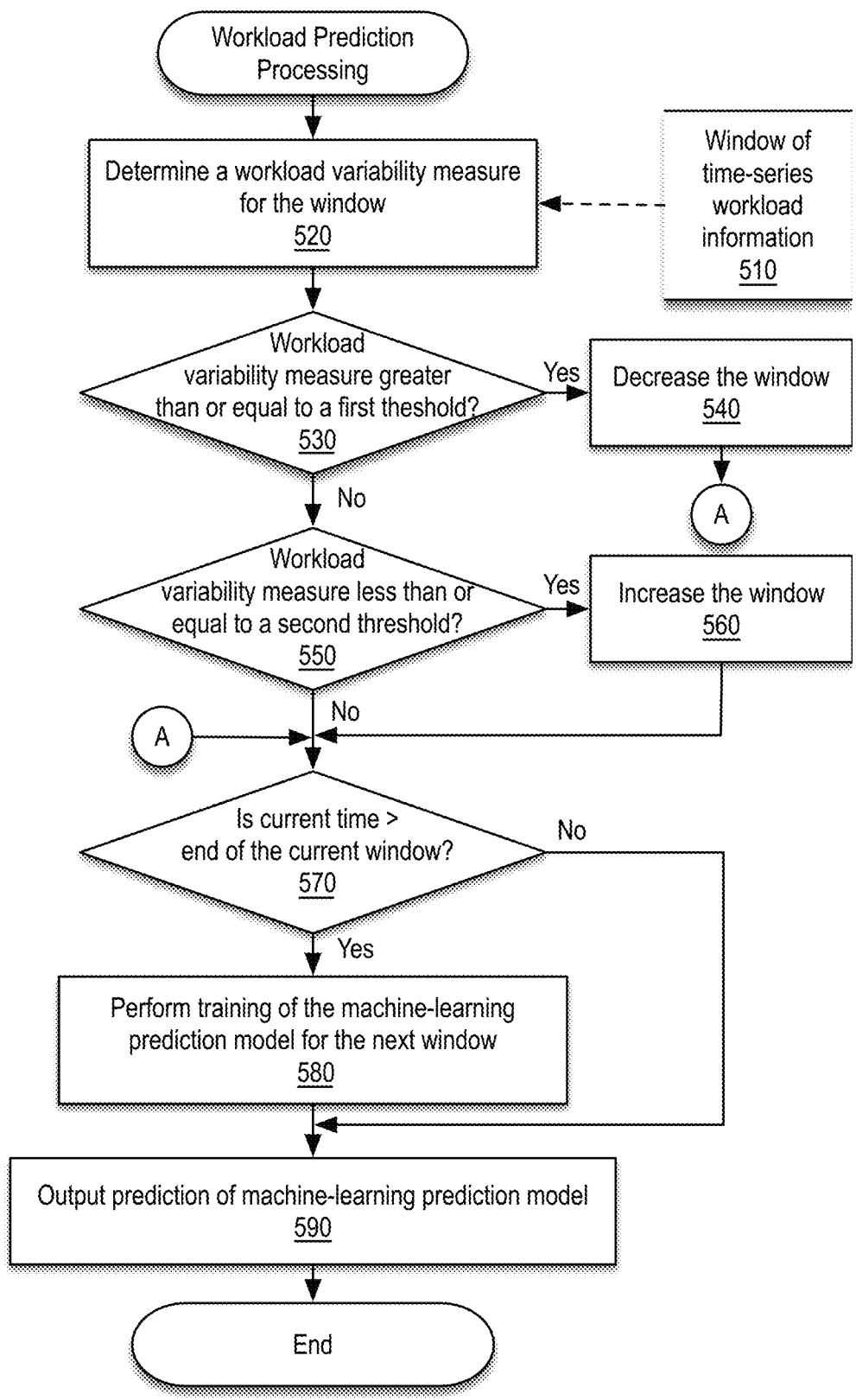
FIG. 5 is a flow diagram illustrating workload prediction processing in accordance with an embodiment.

FIG. 5 is a flow diagram illustrating workload prediction processing in accordance with an embodiment. As noted above, different training and/or prediction approaches may be utilized in accordance with various embodiments to facilitate prediction of workload bursts. The workload prediction algorithm described in the context of the present example represents a non-limiting example of process that may be performed by workload predictor 126 of FIG. 1.

For purposes of completeness and without limitation, a pseudo code example of a workload prediction algorithm ("Algorithm 2") is presented below following the more general description provided with reference to FIG. 5.

In one embodiment, the workload prediction represents a future d-unit of time workload at time t during a default window size of W and the machine-learning model is periodically retrained with a fresh set of workload observations. As those skilled in the art will appreciate, the coefficient of determination of a prediction model decreases the further in the future a prediction is attempted. Therefore, more accurate predictions can be achieved by performing the prediction process more frequently. In one embodiment, the workload prediction process is performed every W seconds where W may change dynamically as described further below.

According to one embodiment, the default window size (W) is between approximately 10 and 90 seconds and the prediction time interval (d) is between approximately 1 and 15 seconds. In the context of Algorithm #2 (below), W is 30 seconds and d is 5 seconds. In general, the default window size should be chosen to be large enough to have enough workload samples for training, but should not be too large so that it can respond quickly to bursty workloads. Selection of an appropriate default window size (W) and prediction time interval (d) should also take into consideration the container (function) launching time since launching new containers takes time in order to initialize the containers (e.g., setting up various Linux namespaces for the network, filesystem, etc). For example, if W and d are shorter than launching a new container, the newly launched container may not be ready to serve the expected future requests in time. Empirical data suggests common container launching times of on the order of between about 6 to 7 seconds.

According to one embodiment, the machine-learning prediction model for predicting future workloads is based on the past observations of the workload over a window size of W time units. For example, a workload prediction at a future time t+d may be made by training an SVR model using the observed/monitored workload information during a window size of [t−W, t]. Then, the trained SVR model may be used to make a regression prediction for the future time t+d. In some embodiments, the window size is changed dynamically based on the workload variations over time. For example, the training window size may be increased when the workload variation over the current window is relatively low as indicated by a threshold and decreased once the workload variation meets or exceeds another threshold.

According to one embodiment, a window of time-series workload information 510 is accessible to the workload prediction processing. For example, the time-series workload information (X) may be in the form of an array, a circular buffer or other suitable data structure and may include workload observations for each unit of time (e.g., one second) employed beginning at time W−t and ending at time t.

At block 520, a workload variability measure is determined for the current window. According to one embodiment, the workload variation over the current window is a function of the maximum observed workload and the minimum observed workload during the current window. For example, the workload variability measure may be calculated by dividing the difference between the maximum observed workload and the minimum observed workload by the minimum observed workload as illustrated below with reference to Algorithm #1.

At decision block 530, it is determined whether the workload variability measure is greater than or equal to a first threshold. If so, then processing branches to block 540; otherwise, processing continues with decision block 550. According to one embodiment, the first threshold is between approximately 0.15 and 0.25 (meaning the workload variation is between approximately 15% and 25%). In the context of Algorithm #2 (below), the first threshold is 0.2.

At block 540, the window (W) is decreased so as to capture fewer workload observations due to the relatively high degree of workload variation during the current window. According to one embodiment, W is decreased by a factor of between approximately 1.5 to 2.5. In the context of Algorithm #2 (below), the factor is 2.

At decision block 550, it is determined whether the workload variability measure is less than or equal to a second threshold. If so, then processing branches to block 560; otherwise, processing continues with decision block 570. According to one embodiment, the second threshold is between approximately 0.5 and 0.15 (meaning the workload variation is between approximately 5% and 15%). In the context of Algorithm #2 (below), the second threshold is 0.1.

At block 560, the window (W) is expanded so as to capture additional workload observations due to the relatively low degree of workload variation during the current window. According to one embodiment, W is increased by a multiple of between approximately 1.5 to 2.5. In the context of Algorithm #2 (below), the multiple is 2.

At decision block 570, it is determined whether the current time is beyond the end of the current window. If so, then processing continues with block 580; otherwise, processing branches to block 590.

At block 580, the machine-learning prediction model is trained for the next window. Depending upon the particular implementation, the machine-learning prediction model may be based on an SVR model or a deep learning model. According to one embodiment, an RBF SVR kernel is used to train the machine-learning prediction model. In alternative embodiments various other SVR kernels may be used including, but not limited to, linear, polynomial, and sigmoid SVR kernels. Further details regarding an example training process is provided below with reference to FIG. 6.

Figure 6:
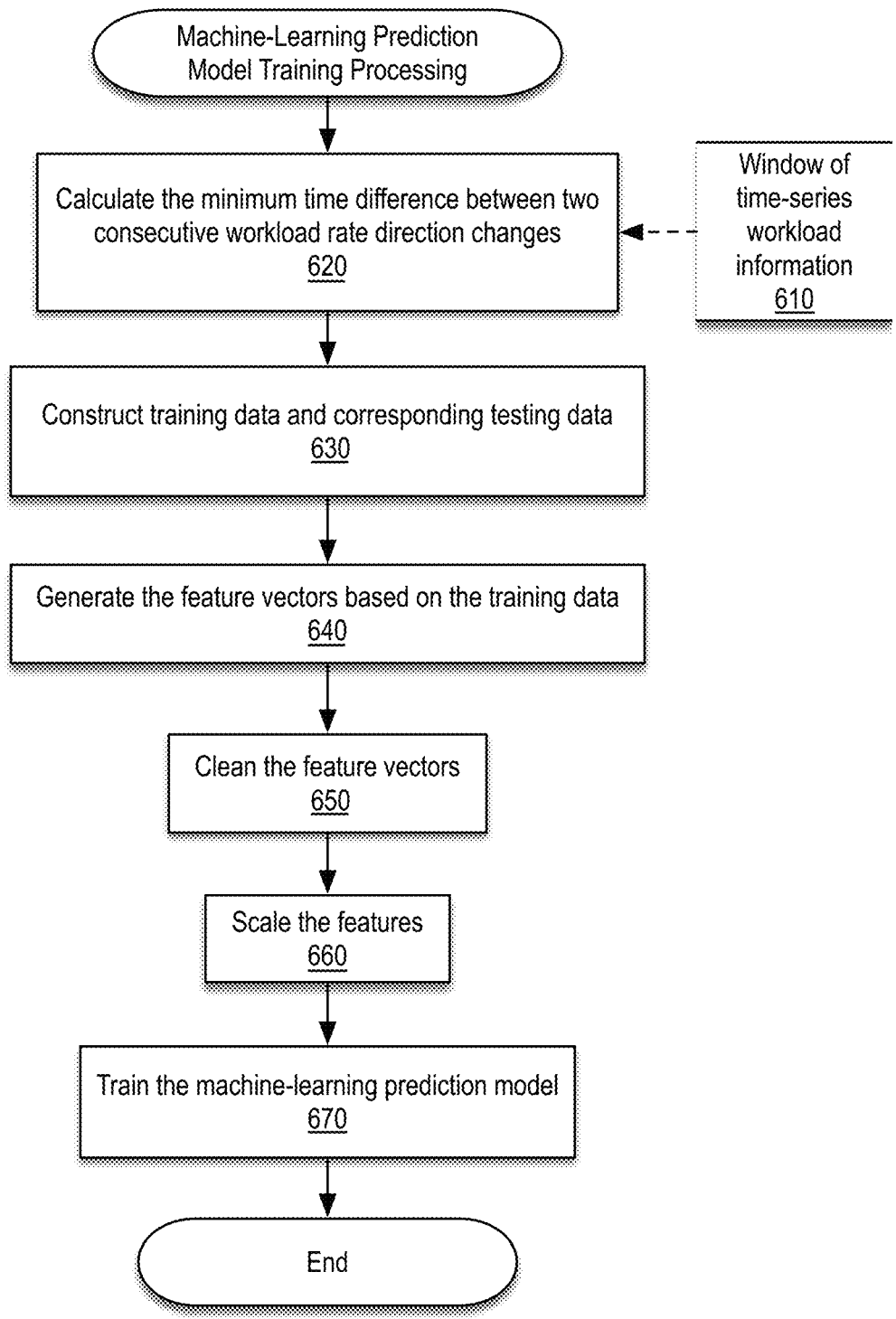
FIG. 6 is a flow diagram illustrating training processing in accordance with an embodiment.

At block 590, the prediction of the machine-learning prediction model is outputted. According to one embodiment, the prediction represents a predicted future workload at time t+d, where t is the current time. For example, the machine-learning prediction model may predict the application will receive Z QPS at time t+d. For purposes of completeness and without limitation, a pseudo code example of an example of a workload prediction algorithm ("Algorithm 2") is presented below:

---
Algorithm #2-Example Workload Prediction Algorithm
---
1. Input: Feature vector: monitored workload information (X) during a window size of W.
2. Output: Predicted future workload at time t+d, where t is the current time.
3. Set the default window size: W = 30 seconds ---
-continued Algorithm #2-Example Workload Prediction Algorithm
---
4. Save the current time: $prev_t = t$;
5. if $\frac{|\max_{i \in W} X(i) - \min_{j \in W} X(j)|}{\min_{j \in W} X(j)} \geq 0.2$, then
6.    W = W/2;
7. else if $\frac{|\max_{i \in W} X(i) - \min_{j \in W} X(j)|}{\min_{j \in W} X(j)} \geq 0.1$, then
8.    W = 2W;
9. if $t > prev_t + W$, then
10.    SVR-Train(X[t-W,t]y, -- See, e.g., Algorithm #2 (below)
11.    output = SVR-Predict(X[t+d]); -- See, e.g., Algorithm #1
12.    $prev_t = t$;

FIG. 6 is a flow diagram illustrating training processing in accordance with an embodiment. The training processing described in the context of the present example, represents a non-limiting example of how a machine-learning prediction model (e.g., machine-learning prediction model 335 of FIG. 3A) may be trained to facilitate workload prediction performed by workload predictor 126 of FIG. 1.

According to one embodiment, a window of time-series workload information 610 represents an input parameter to or is otherwise made available to the machine-learning prediction model training processing. As noted above, the time-series workload information (X) may be in the form of an array, a circular buffer or other suitable data structure and may include workload observations for each unit of time (e.g., one second) employed beginning at time W-t and ending at time t.

At block 620, a minimum time difference is calculated between two consecutive workload rate direction changes from negative to positive or positive to negative.

At block 630, training data and corresponding testing data are constructed. According to one embodiment, the observed workload (e.g., QPS) in the time interval [t-W,t] at time t is used as training data and the future workload (e.g., QPS), predicted at time t+d is used as the test data. For example, the predicted QPS value can be compared with the actual QPS value that is observed at time t+d. This process may then be repeated for the next time interval over the next window size of W.

At block 640, the feature vectors are generated based on the training data.

At block 650, the feature vectors are cleaned. According to one embodiment, unavailable data is removed, the feature vectors are normalized, and the feature vectors are made unitless.

At block 660, the feature vectors are scaled. According to one embodiment, the feature is scaled to the range of [−1, +1].

At block 670, the machine-learning prediction model is trained based on feature vectors resulting from a dimensionality reduction resulting from performing a principal component analysis (PCA) algorithm. For purposes of completeness, a non-limiting pseudo code example of an SVR training procedure ("Algorithm #3) is presented below:

| Algorithm #3 - SVR Training Procedure |
|---|
| 1. Input: Time series workload information (X). |
| 2. Output: SVR Model to predict future d-second workload at time t during a window size of W. |
| 3. Calculate the minimum time difference between two consecutive workload rate direction changes from negative to positive or vice versa ($min_{dist}$). |
| 4. Construct the training data from t − W to t and the corresponding testing data for the future d seconds from t − W + d to t + d. |
| 5. Generate the feature vectors from training data, including training data, their respective W, W/2, . . . , W = W/$2^n$ moving averages, where n > $\log_2$(W = $min_{dist}$) and the corresponding ground truth from the training data. |
| 6. Clean the feature vectors by normalizing, making unitless, and removing unavailable data. |
| 7. Scale the feature to the range of [−1; +1]. |
| 8. Perform feature reduction using PCA. |
| 9. Get support vector regression model: SvrModel = SVR(kernel = 'rbf', gamma = 'auto'). And train the model: SvrModel.fit($X_{train}$, $Y_{train}$), where $X_{train}$ is a vector of time values and the corresponding workload values are stored in vector $Y_{train}$. |

Figure 7:
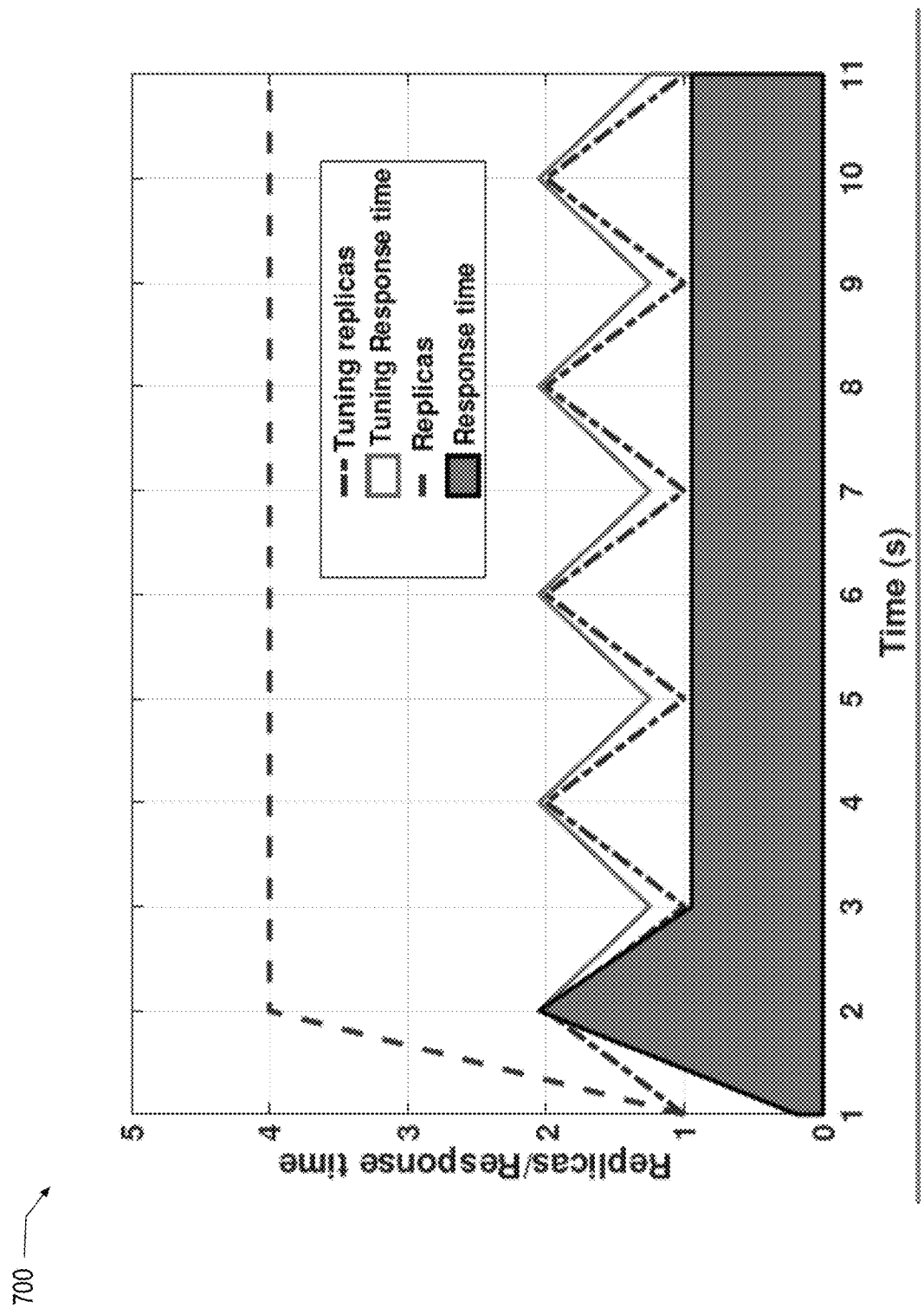
FIG. 7 is a graph illustrating tuning of parameters of a proportional integral (PI) controller in accordance with an embodiment.

FIG. 7 is a graph illustrating tuning of parameters of a proportional integral (PI) controller in accordance with an embodiment. In the context of the present example, the number of replicas and response time are represented on the y-axis and time is represented on the x-axis. As noted above, in one embodiment, the tuning of the PI controller 240 is performed by first setting $K_I$ in Eq. #1 to zero and then incrementally increasing the proportional gain (Kp) of Eq. #1 until it reaches the ultimate gain $K_u$ at which the response time starts to oscillate (e.g., as illustrated in graph 700). At this point, in one embodiment, $K_u$ and the oscillation period $T_u$ can be used to determine the new number of replicas (R(k)) by setting $K_p$ of Eq. #1 to a fraction of $K_u$ (e.g., 0.45$K_u$) and setting $K_I$ to a fraction of a function of $K_u$ and $T_u$ (e.g., 0.54$K_u/T_u$) In the context of the present example, a steady response time of 1 unit of time is achieved by setting the new number of replicas (R(k)) to 4 as determined by Eq. #1.

Figure 8:
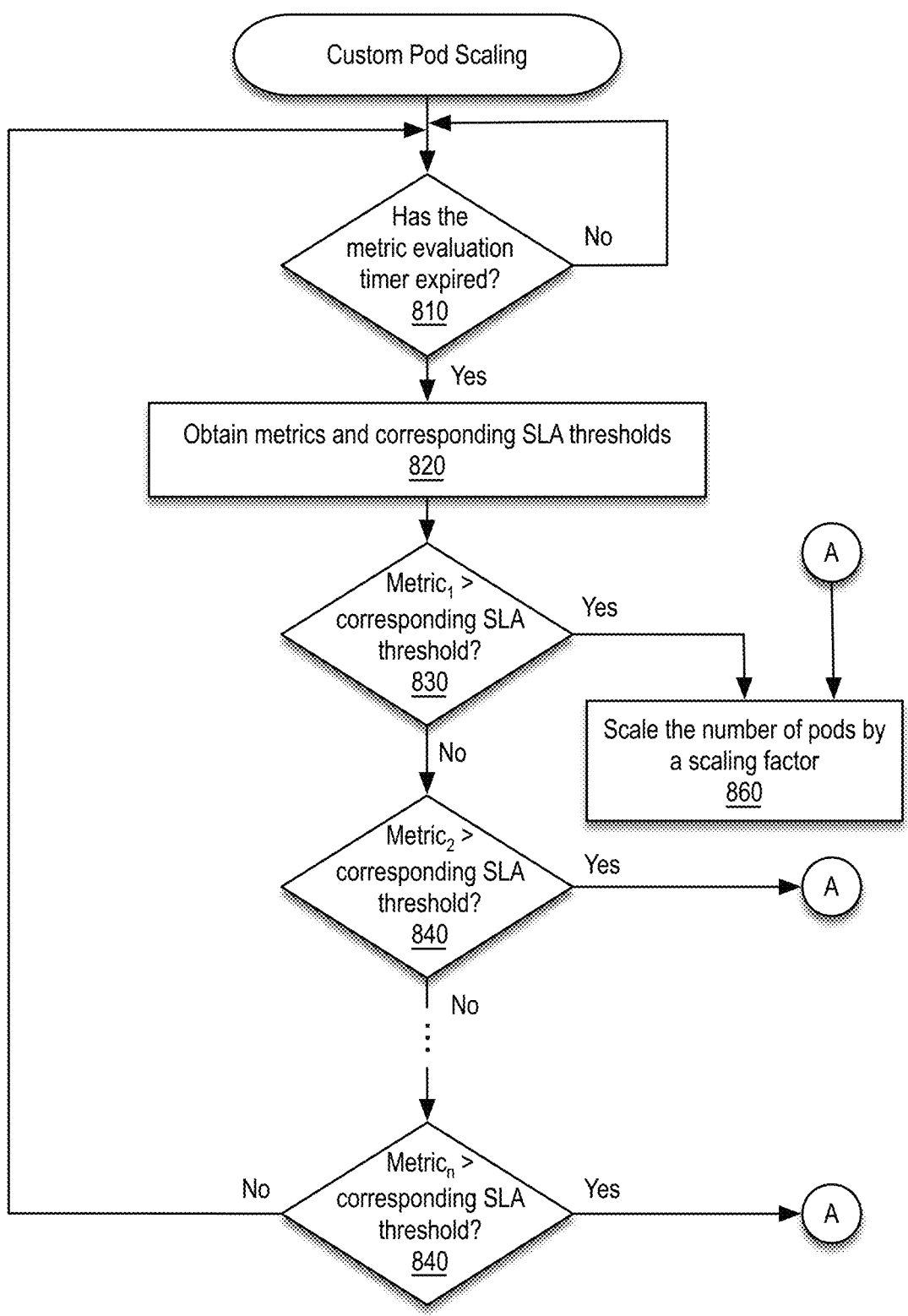
FIG. 8 is a flow diagram illustrating custom pod scaling in accordance with an embodiment.

FIG. 8 is a flow diagram illustrating custom pod scaling in accordance with an embodiment. In various examples described herein, a server (e.g., a host server 110 and/or one or more hardware accelerators 120, individually or in combination) may implement one of three different autoscaling approaches (e.g., a queue-based auto-scaler, a custom pod scaler, or a control-theory based auto-scaler). In the context of the present example, a non-limiting example of process that may be performed by a custom pod scaler that may be implemented by scheduling engine 116 is described.

At decision block 810, it is determined whether a metric evaluation timer has expired. If so, processing continues with block 820; otherwise, processing loops back to decision block 810. According to one embodiment a backoff timer may be used to control the interval at which the various metrics are evaluated. The backoff timer may be set in accordance with the needs of the system. As one non-limiting example, the workload's dynamic behavior may be used to set the backoff timer. For example, if the number of queries per second changes by a predetermined or configurable percentage (e.g., 20%) over a time frame of W seconds, which may be expressed as $$\frac{|\max_{i \in W} X(i) - \min_{j \in W} X(j)|}{\min_{j \in W} X(j)} \geq 0.2,$$

then the backoff timer may be set to W.

At block 820, various metrics may be calculated/derived based on a set of available metrics and corresponding SLA thresholds may be obtained. Non-limiting examples of calculated/derived metrics and a particular set of available metrics are described below. In one embodiment, the corresponding SLA thresholds may be determined empirically.

At decision block 830, it is determined whether a first metric ($Metric_1$) is greater than a corresponding SLA threshold. If so, processing branches to block 860; otherwise, processing continues with decision block 840.

At decision block 840, it is determined whether a second metric ($Metric_2$) is greater than a corresponding SLA threshold. If so, processing branches to block 860; otherwise, processing continues with decision block 850.

At decision block 850, it is determined whether an nth metric ($Metric_n$) is greater than a corresponding SLA threshold. If so, processing branches to block 860; otherwise, processing loops back to decision block 810.

At block 860 the number of pods is scaled by a scaling factor. According to one embodiment, the scaling factor Δ is calculated as follows:

$$\Delta = \text{ceil}\left[currentReplicas \times \frac{currentMetricValue}{desiredMetricValue}\right]$$

According to one embodiment, the set of available metrics include:

gateway_functions_seconds, representing how many seconds each API gateway function invocation takes to run over an observed window size of Tr.

gateway_function_invocation_total, representing a count of the total number of API gateway function invocations during the window.

gateway_service_count, representing a number of replicas (e.g., pods) for a particular function.

http_request_duration_second, representing how many seconds each HTTP request takes to run during the window; and http_requests_total, representing a count of the total number of HTTP requests received during the window.

In one embodiment the calculated/derived metrics include:

$$\theta_c = \frac{\text{rate}(gateway\_functions\_seconds\_sum[Tr])}{\text{rate}(gateway\_functions\_seconds\_counts[Tr])}$$

$$\Omega_c = \frac{\text{sum}(gateway\_function\_invocation\_total[Tr])}{\text{rate}(gateway\_service\_count[Tr])}$$

$$\psi_c = \frac{\text{sum}(http\_request\_durration\_seconds[Tr])}{\text{rate}(http\_requests\_total[Tr])}$$

The first calculated/derived metric ($\theta_c$) is indicative of how many seconds each function invocation takes to run over an observed window size of Tr. The second calculated/derived metric ($\Omega_c$), which is calculated by dividing function invocation count by the number of the function's replicas, represents how many function invocations on average each replica will process. The third calculated/derived metric ($\psi_c$) represents the average time spent to serve each HTTP request.

Figure 9:
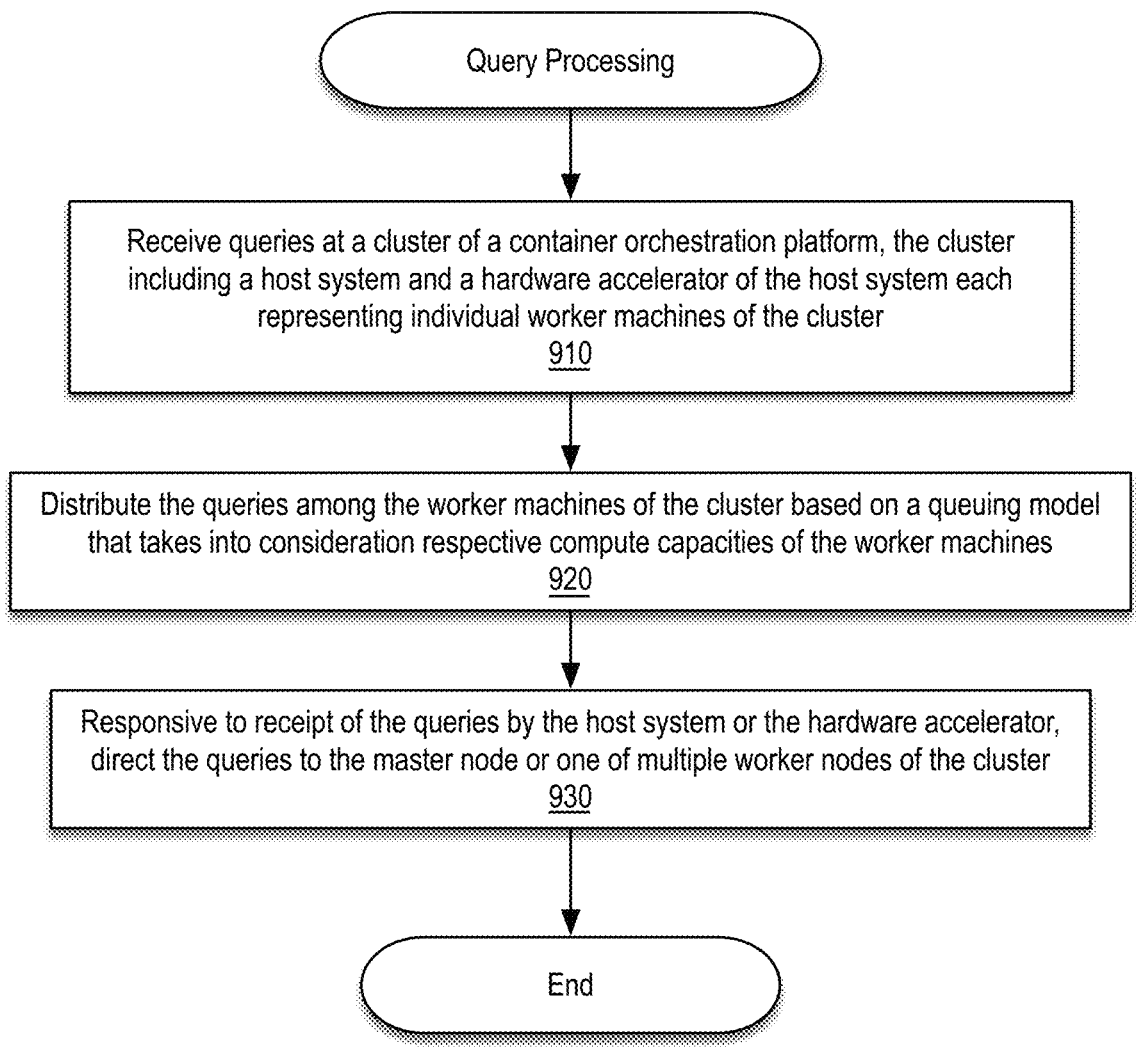
FIG. 9 is a flow diagram illustrating query processing in accordance with an embodiment.

FIG. 9 is a flow diagram illustrating query processing in accordance with an embodiment. In various examples described herein, a novel architecture facilitates performance of edge acceleration by leveraging the fault tolerance and resource efficiency of a serverless computing platform. For example, a heterogeneous cluster (e.g., cluster 130) may be distributed across one or more host servers (e.g., host server 110) and one or more hardware accelerators (e.g., hardware accelerator 120) of the host server(s), thereby allowing serverless functions to be offloaded from the host server(s) to the hardware accelerator(s). The present example provides an example of query processing in such an environment.

At block 910, queries are received at a cluster (e.g., cluster 130) of a container orchestration platform. The queries may initially be received at an API gateway (e.g., API gateway 140) serving as an entry point to the cluster. In one embodiment, the cluster is a heterogeneous cluster of a serverless framework and additionally includes a host system and a hardware accelerator of the host system in which the host system and the hardware accelerator have differing compute capacities. The queries may be HTTP requests received from clients accessing the serverless workload functions implemented within the cluster. In contrast to traditional architectures in which a host server and its hardware accelerator are treated collectively as a single worker machine of cluster, in various embodiments the host server and the hardware accelerator may each individually represent a separate worker machine or node of the cluster 130.

At block 920, the queries are distributed among the worker machines of the cluster based on a queuing model that takes into consideration respective compute capacities of the worker machines. For example, a traffic distributor (e.g., traffic distributor 141) may solve a queuing problem representing how to distribute the received client queries among the worker machines for one or more cases including a deterministic queuing model (e.g., D/D/1 queues) and an M/M/1 queuing model in accordance with Eqs. #1-3 above.

At block 930, responsive to receipt of the queries by the host system or the hardware accelerator, the queries are directed to the master node or one of multiple worker nodes of the cluster in accordance with the traffic distribution determined at the API gateway. Depending upon the particular implementation, a subset or all of the worker nodes of the cluster may be hosted by one or more hardware accelerators of the host system, thereby supporting offloading of application instances running on the worker nodes partially or entirely to the one or more hardware accelerators. As described above, various scaling approaches, including auto-scaling and custom pod scaling, may also be supported in the context of the novel system architecture.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 10:
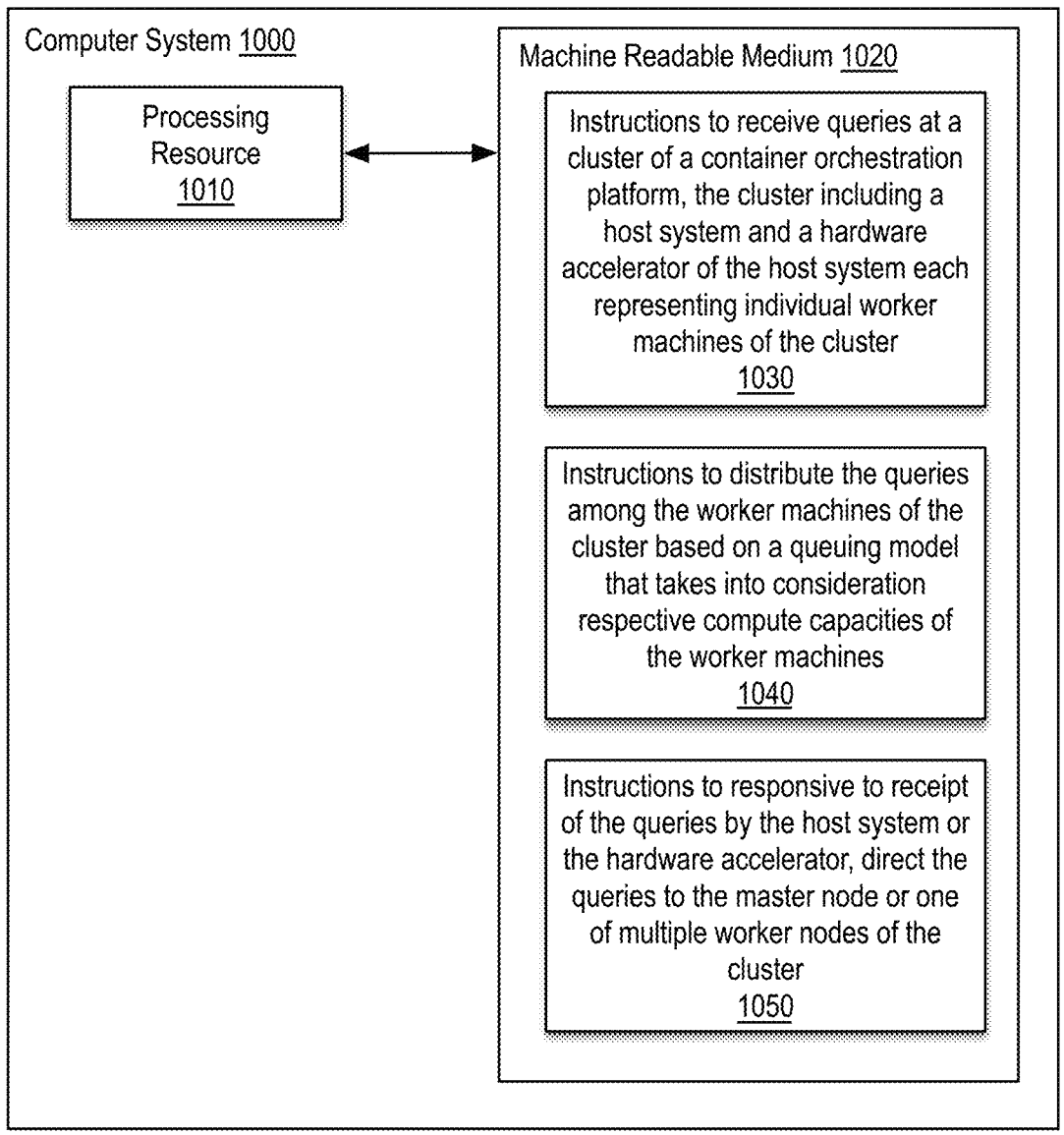
FIG. 10 is a block diagram of a computer system in accordance with an embodiment.

FIG. 10 is a block diagram of a computer system in accordance with an embodiment. In the example illustrated by FIG. 10, computer system 1000 includes a processing resource 1010 coupled to a non-transitory, machine readable medium 1020 encoded with instructions to perform a proactive auto-scaling method in accordance with a private cloud embodiment. The processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000. Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1050. It should be understood that part or all of the executable instructions and/or electronic circuits included within one block may, in alternate implementations, be included in a different block shown in the figures or in a different block not shown.

Instructions 1030, upon execution, cause the processing resource 1010 to receive queries at a cluster of a container orchestration platform, the cluster including a host system and a hardware accelerator of the host system, each representing individual worker machines of the cluster. In one embodiment, instructions 1030 may be useful for performing block 910 of FIG. 9.

Instructions 1040, upon execution, cause the processing resource 1010 to distribute the queries among the worker machines of the cluster based on a queuing model that takes into consideration respective compute capacities of the worker machines. In one embodiment, instructions 1040 may be useful for performing block 920 of FIG. 9.

Instructions 1050, upon execution, cause the processing resource 1010 to responsive to receipt of the queries by the host system or the hardware accelerator, direct the queries to the master node or one of multiple worker nodes of the cluster. In one embodiment, instructions 1040 may be useful for performing block 920 of FIG. 9.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A method comprising:
   receiving queries at a gateway of a cluster of a container orchestration platform, wherein the cluster includes a host system comprising a first processing resource and a hardware accelerator of the host system, the hardware accelerator comprising a second processing resource, wherein the host system comprising the first processing resource or the hardware accelerator comprising the second processing resource comprises a primary node of the cluster, and wherein the host system and the hardware accelerator comprise a plurality of worker nodes of the cluster;
   distributing, at the gateway, the queries among the plurality of worker nodes of the host system and the hardware accelerator based on a queuing model that takes into consideration respective compute capacities of the first processing resource of the host system and the second processing resource of the hardware accelerator;
   performing auto-scaling to run a quantity of instances of an application in the plurality of worker nodes; and
   responsive to receipt of the queries, directing the queries to the plurality of worker nodes according to the distributing for processing, by the plurality of worker nodes, the quantity of instances of the application.

2. The method of claim 1, wherein the hardware accelerator comprises a System on a Chip (SOC) based Smart Network Interface Card (SmartNIC).

3. The method of claim 1, wherein the application comprises a key-value store or an analytics application.

4. The method of claim 1, wherein the container orchestration platform comprises a Kubernetes container orchestration platform.

5. The method of claim 1, further comprising:
   monitoring a number of the queries received at the gateway for processing by the application;
   maintaining historical data regarding queries over time; and
   predicting, based on the number of the queries received at the gateway and the historical data, a future workload for the application, wherein the auto-scaling is based on the predicted future workload.

6. The method of claim 5, wherein the auto-scaling comprises:
   measuring a metric for the application in the cluster; and
   scaling the quantity of instances of the application based on a relation of the measured metric to a target value of the metric, the scaling comprising increasing or decreasing the quantity of instances of the application.

7. The method of claim 6, wherein the measuring of the metric and the predicting of the future workload are performed by the hardware accelerator.

8. The method of claim 6, wherein the target value of the metric is according to a service level agreement (SLA).

9. The method of claim 5, wherein the predicting of the future workload is performed by the hardware accelerator.

10. The method of claim 1, wherein the auto-scaling of the quantity of instances of the application comprises increasing or decreasing a quantity of containers or pods in which the instances of the application are to execute.

11. The method of claim 1, wherein the host system comprises a plurality of hardware accelerators, and wherein the plurality of hardware accelerators are to serve as a subset of the plurality of worker nodes.

12. The method of claim 1, wherein the primary node comprises a scheduler to schedule workloads on the plurality of worker nodes.

13. A non-transitory machine readable medium comprising instructions that when executed cause a system to:
   receive queries at an Application Programming Interface (API) gateway of a cluster of a container orchestration platform, wherein the cluster includes a host system comprising a first processing resource and one or more hardware accelerators comprising a second processing resource, wherein the host system comprising the first processing resource or a hardware accelerator of the one or more hardware accelerators comprising the second processing resource comprises a primary node of the cluster, and wherein the host system and the one or more hardware accelerators comprise a plurality of worker nodes of the cluster;
   determine, by the API gateway, a distribution of the queries among the plurality of worker nodes of the host system and the one or more hardware accelerators based on a queuing model that takes into consideration respective compute capacities of the host system and the one or more hardware accelerators;
   perform auto-scaling to run a quantity of instances of an application in the plurality of worker nodes; and
   responsive to receipt of the queries, direct the queries to the plurality of worker nodes according to the distribution for processing, by the plurality of worker nodes, the quantity of instances of the application.

14. The non-transitory machine readable medium of claim 13, wherein a hardware accelerator of the one or more hardware accelerators comprises a System on a Chip (SOC) based Smart Network Interface Card (SmartNIC.

15. The non-transitory machine readable medium of claim 13, wherein the auto-scaling of the quantity of instances of the application comprises increasing or decreasing a quantity of containers or pods in which the instances of the application are to execute.

16. The non-transitory machine readable medium of claim 13, wherein the instructions when executed cause the system to:

monitor a number of the queries received at the API gateway for processing by the application;

access historical data regarding queries over time; and predict, based on the number of the queries received at the API gateway and the historical data, a future workload for the application, wherein the auto-scaling is based on the predicted future workload.

17. The non-transitory machine readable medium of claim 16, wherein the instructions when executed cause the system to:

measure a metric for the application in the cluster; and scale the quantity of instances of the application based on a relation of the measured metric to a target value of the metric.

18. A system comprising:

a cluster comprising a gateway and a host system comprising a processing resource and a plurality of hardware accelerators, wherein the host system or a hardware accelerator of the plurality of hardware accelerators comprises a primary node of the cluster, and the host system and the plurality of hardware accelerators comprise a plurality of worker nodes of the cluster, wherein the gateway comprises a non-transitory storage medium comprising instructions executable at the gateway to:

receive queries at the gateway; and determine a distribution of the queries among the plurality of worker nodes of the host system and the plurality of hardware accelerators based on a queuing model that takes into consideration respective compute capacities of the host system and the plurality of hardware accelerators, wherein the host system is to perform auto-scaling to run a quantity of instances of an application in the plurality of worker nodes, and wherein the queries are directed to the plurality of worker nodes according to the distribution for processing, by the plurality of worker nodes, the quantity of instances of the application.

19. The system of claim 18, wherein a given hardware accelerator of the plurality of hardware accelerators is to:

monitor a number of the queries received at the gateway for processing by the application;

access historical data regarding queries over time; and predict, based on the number of the queries received at the gateway and the historical data, a future workload for the application, wherein the auto-scaling is based on the predicted future workload.

20. The system of claim 19, wherein the given hardware accelerator is to:

measure a metric for the application in the cluster, wherein the host system is to perform the auto-scaling by scaling the quantity of instances of the application based on a relation of the measured metric to a target value of the metric.

* * * * *